United States Patent
Cheiky (10) Patent No.: US 8,216,430 B2
(45) Date of Patent: Jul. 10, 2012

(54) SYSTEM AND METHOD FOR BIOMASS FRACTIONING

(75) Inventor: Michael C. Cheiky, Thousand Oaks, CA (US)

(73) Assignee: Cool Planet Biofuels, Inc., Camarillo, CA (US)

( * ) Notice: Subject to any disclaimer, the term of this patent is extended or adjusted under 35 U.S.C. 154(b) by 321 days.

(21) Appl. No.: 12/688,523

(22) Filed: Jan. 15, 2010

(65) Prior Publication Data

US 2010/0180805 A1    Jul. 22, 2010

Related U.S. Application Data

(60) Provisional application No. 61/146,079, filed on Jan. 21, 2009.

(51) Int. Cl.
*C10B 49/00* (2006.01)
*B02C 23/36* (2006.01)

(52) U.S. Cl. ......... 202/216; 202/96; 202/117; 202/118; 241/43; 241/46.08; 241/66

(58) Field of Classification Search ............ 202/85, 202/96, 117, 118, 216; 422/224, 232, 233; 201/25; 241/21, 25, 43, 46.08, 66; 110/342
See application file for complete search history.

(56) References Cited

U.S. PATENT DOCUMENTS

| | | |
|---|---|---|
| 203,016 A | 4/1878 | Edison |
| 474,230 A | 5/1892 | Edison |
| 222,390 A | 12/1879 | Edison |
| 4,268,275 A | 5/1981 | Chittick |
| 4,421,524 A | 12/1983 | Chittick |
| 4,487,958 A | 12/1984 | Ream et al. |
| 4,497,637 A | 2/1985 | Purdy et al. |
| 4,530,702 A | 7/1985 | Fetters et al. |
| 4,861,351 A | 8/1989 | Nicholas et al. |
| 4,992,480 A | 2/1991 | Mahajan et al. |
| 5,032,618 A | 7/1991 | Marchionna et al. |
| 5,087,786 A | 2/1992 | Nubel et al. |
| 5,221,290 A | 6/1993 | Dell |
| 5,504,259 A | 4/1996 | Diebold et al. |
| 5,756,194 A | 5/1998 | Shogren et al. |
| 5,820,640 A | 10/1998 | Ikura et al. |
| 5,857,807 A | 1/1999 | Longo |

(Continued)

FOREIGN PATENT DOCUMENTS

KR    100819505    3/2008

(Continued)

OTHER PUBLICATIONS

Z. Rosenberg; "More on Commercial Carbon Resistors as Low Pressure Guages," Intl. Jour. of Impat Eng. 34 (2007) pp. 732-742.

(Continued)

*Primary Examiner* — Nina Bhat
(74) *Attorney, Agent, or Firm* — David E. Heisey; Sheppard Mullin Richter & Hampton LLP (57) ABSTRACT

A biomass fractionator and method are described for inputting ground biomass and outputting several vapor streams of bio-intermediate compounds along with syngas and biochar. A method for biomass fractioning comprises dispensing biomass into thin sheets of ground biomass; subjecting the thin sheets to ramps of temperature; and selectively collecting various groups of compounds as they are released from the thin sheets.

9 Claims, 5 Drawing Sheets

U.S. PATENT DOCUMENTS

| | | | |
|---|---|---|---|
| 6,133,328 | A | 10/2000 | Lightner |
| 6,227,473 | B1 | 5/2001 | Arnold |
| 6,339,031 | B1 | 1/2002 | Tan |
| 6,548,026 | B1 | 4/2003 | Dales et al. |
| 6,747,067 | B2 | 6/2004 | Melnichuk et al. |
| 6,811,703 | B2 | 11/2004 | Elliott |
| 6,841,085 | B2 | 1/2005 | Werpy et al. |
| 6,923,838 | B2 | 8/2005 | Maubert et al. |
| 6,994,827 | B2 | 2/2006 | Safir et al. |
| 7,033,972 | B2 | 4/2006 | Shikada et al. |
| 7,226,566 | B2 | 6/2007 | Beierle |
| 7,438,785 | B2 * | 10/2008 | Meier et al. ............ 201/21 |
| 7,458,999 | B2 | 12/2008 | Schenck et al. |
| 7,748,653 | B2 * | 7/2010 | Palm ............ 241/27 |
| 7,846,979 | B2 | 12/2010 | Rojey et al. |
| 7,857,943 | B2 * | 12/2010 | Noto ............ 201/21 |
| 7,888,540 | B2 | 2/2011 | Deluga et al. |
| 2003/0119952 | A1 | 6/2003 | Werpy et al. |
| 2004/0111968 | A1 | 6/2004 | Day et al. |
| 2008/0006519 | A1 | 1/2008 | Badger |
| 2008/0093209 | A1 | 4/2008 | Noto |
| 2008/0216391 | A1 | 9/2008 | Cortright et al. |
| 2008/0223269 | A1 * | 9/2008 | Paoluccio ............ 110/342 |
| 2008/0300435 | A1 | 12/2008 | Cortright et al. |
| 2008/0317657 | A1 | 12/2008 | Hall et al. |
| 2009/0007484 | A1 | 1/2009 | Smith |
| 2009/0139139 | A1 | 6/2009 | Tilman et al. |
| 2009/0151251 | A1 | 6/2009 | Manzer et al. |
| 2009/0183430 | A1 | 7/2009 | Schubert et al. |
| 2009/0217575 | A1 | 9/2009 | Raman et al. |
| 2009/0253947 | A1 | 10/2009 | Bandvold et al. |
| 2009/0308787 | A1 | 12/2009 | O'Connor et al. |
| 2010/0040510 | A1 | 2/2010 | Randhava et al. |
| 2010/0162780 | A1 | 7/2010 | Scharf |
| 2010/0180805 | A1 | 7/2010 | Cheiky |
| 2010/0218417 | A1 | 9/2010 | Bauldreay et al. |
| 2010/0223839 | A1 | 9/2010 | Perez et al. |
| 2010/0257775 | A1 | 10/2010 | Cheiky |
| 2010/0270505 | A1 | 10/2010 | Gallaspy et al. |
| 2010/0300866 | A1 | 12/2010 | Van Aardi et al. |
| 2011/0023566 | A1 | 2/2011 | Lodwig et al. |
| 2011/0177466 | A1 | 7/2011 | Cheiky |

FOREIGN PATENT DOCUMENTS

| | | |
|---|---|---|
| WO | WO 2009004652 | 1/2009 |

OTHER PUBLICATIONS

R. Buerschaper, "Thermal & Electrical Conductivity of Graphite & Carbon at Low Temperatures," Jour. of App. Physics; (1994) pp. 452-454.

I.M. Lima, "Physiochemical & Adsorption Properties of Fast-Pyrolysis Bio-Chars & their Steam Activated Counterparts," J. Chem. Biotechnical (2010) 85, pp. 1515-1521.

Cheng, CHih-Hsin; "Stability of Black Carbon in Soils Across a Climatic Gradient," Jour. of Geophysical Research Biogeosciences; 113 (2008) G02027; pp. 1-10.

Lehmann, J.; Nutrient Avail. & Leaching in an Archaeological Anthrosol & Ferraisol of the Central Amazon Basin: Fertilizer, Manure.; Plant Soil 249 (2003); pp. 343-357.

Preston, C.M.; Black (Pyrogenic) Carbon: a Synthesis of Current Knowledge & Uncertainities w/Special Consideration of Boreal Regions; Biogeosciences 3 (2006); pp. 397-420.

Tryon, E.H.; "Effect of Charcoal on Certain Physical, Chemical, & Biological Properties of Forest Soils," Ecological Monoraphs, vol. 18, No. 1 (Jan. 1948); pp. 81-115.

Faludi, J.; "World Changing Change Your Thinking a Carbon-Negative Fuel;" Oct. 16, 2007; www.worldchanging.com.

Laird, David; "The Charcoal Vision: A Win Win Scenario," 2008, Agron, J., vol. 100, No. 1, pp. 178-181.

Ogawa; "Carbon Sequestration by Carbonization of Biomass & Forestation; 3 Case Studies," Mitigation & Adaption Strategies for Global Change, vol. 11 (2006); pp. 429-444.

Demirbas, "Effects of Temperature & Particle Size on Bio-Char Yield from Pyrolysis of Agricultural Residues," J. Anal. Pyrolysis, vol. 72 (2004); pp. 243-248.

Kim et al.; Characteristics of Crosslinked Potato Starch & Starch-Filled Linear Low-Density Polyethylene Films, Carbohydrate Polymers, vol. 50 (2002); pp. 331-337.

Norman, et al.; "Best Management Practices for Reclaiming Surface Mines in Washington and Oregon," Open-File Report 0-92-2, revised ed. Dec. 1997; www.oregongeology.org Feb. 9, 2010.

E. Gegver & K. Hayek; "A Fully Programmable System for the Study of Catalytic Gas Reactions," 1985 J. Physc. E: Sci, Instrum. 18 836.

D.C. Elliott; "Liquid Fuels by Low-Severity Hydrotreating of Biocrude," Dev. in Thermochemical Biomass Conversion; vol. 1, pp. 611-621.

Dinesh Mohan, "Pyrolysis of Wood/Biomass for Bio-Oil: A Critical Review," Energy & Fuels (2006) 20, pp. 848-889.

Ramesh K. Sharma; "Catalytic Upgrading of Pyrolysis Oil," Energy & Fuels (1993), 7, pp. 306-314.

Thiam Leng Chew, "Catalytic Processes Towards the Production of Biofuels in a Palm Oil and Oil Palm Biomass-based Biorefinery," Bioresource Tech. 99 (2008), pp. 7911-8922.

K. Omata; "Optimization of Cu Oxide Catalyst for Methanol Synthesis under High C02 Partial Pressure Using Combinatorial Tools," App. Catalyst A: General 262 (2004), 207-214.

Kaoru Takeishi; "Dimethy Eethr & Catalyst Development for Production of Syngas," Biofuels (2010 1(1), pp. 217,226.

* cited by examiner

SYSTEM AND METHOD FOR BIOMASS FRACTIONING

CROSS-REFERENCE TO RELATED APPLICATIONS

This application claims priority from U.S. Provisional Patent Application Ser. Nos. 61/146,079, filed Jan. 21, 2009, the content of which is incorporated herein by reference in its entirety.

FIELD OF THE INVENTION

The present invention is directed towards clean energy, and more particularly, some embodiments of the invention provide systems and methods for biomass fractioning.

DESCRIPTION OF THE RELATED ART

In the early 21st century, global warming and its interrelationship with the widespread use of fossil fuels has become one of the major technological challenges. Finding ways to more effectively use renewable biomass is a very important avenue for addressing these issues. Prior to the beginning of the industrial revolution, wood and plant oils were the primary source of energy for pre-industrial civilizations, which used this energy mainly for heating, cooking, and light. During this early period, biomass was simply burned in open air to produce heat and light. Several thousand years ago, man discovered that if the air supply was restricted during the burning process, a dense black residual (which we now call coke) could be extracted from burning wood. This hot coke could be quenched with water, dried, and re-burnt to produce a much hotter, denser fire. The emergence of coke proceeds in parallel with the development of metallurgy, which is dependent upon its hotter and cleaner fire along with its reducing capabilities to both extract metals from ore and form them into useful products. The process of roasting a combustible material in either a reduced oxygen environment or oxygen-free environment is now called pyrolysis. Pyrolyzing wood and other forms of mixed biomass produces coke (which is sometimes called biochar) and a mixture of hydrogen, carbon monoxide and carbon dioxide, sometimes referred to as syngas. Roasting fossil fuel hydrocarbons in an oxygen-free environment first causes a breakdown of longer chain hydrocarbons into shorter chain hydrocarbons, ultimately resulting in more elemental forms such as methane ($CH_4$), hydrogen, and elemental carbon. In fact, pyrolysis is a fundamental mechanism of petrochemical cracking, which is the backbone of oil refinery processes. More extreme pyrolysis is used in the refinery process to produce hydrogen and high purity carbon.

Likewise, biomass (which is made up of cellulose, hemicelluloses, lignin, starches, and lipids) proceeds through multiple steps of decomposition when subject to the pyrolysis process. In general, when subject to high temperatures (e.g., 800° C.) for prolonged periods of time, pyrolysis ultimately yields syngas. As the temperature and exposure time interval is reduced, an increasing amount of biochar residue remains. At still lower temperatures and time intervals, increasingly complex hydrocarbons and oxygenated hydrocarbons are present in the gas stream from the pyrolyzed biomass. At the low extreme, simple everyday cooking typically drives off water and starts to de-hydrolyze the biomass, causing the darkening and carmelization that we all associate with cooked foods.

Various forms of laboratory and small scale commercial biomass pyrolyzers have been developed to generate useful chemical products from the controlled pyrolysis of biomaterials ranging from wood chips to sewage sludge. Although some pyrolyzers are focused simply on producing syngas, there is considerable effort in the development of milder pyrolyzing conditions, which typically results in a condensed liquid commonly called bio-oil. Many forms of pyrolyzers have been developed at the laboratory level to produce these intermediate compounds, which are collectively referred to as bio-oil or pyrolysis oil. Configurations include simple tube furnaces where the biomass is roasted in ceramic boats, ablative pyrolyzers where wood is rubbed against a hot surface, various forms of fluidized bed pyrolyzers where biomass is mixed with hot sand, and various simpler configurations that are based on earlier coking oven designs.

The fundamental problem with the resultant pyrolysis oil is that it is made up of hundreds to thousands of compounds, which are the result of subjecting the raw biomass to a wide range of temperature, time, and pressure profiles in bulk. When this process is complicated by the thousands of major bio-compounds in the original bio-feedstock, the result is a nearly intractable array of resultant compounds all mixed together. Pyrolysis oils from such processes are typically not thermodynamically stable. They contain active oxygenated free radicals that are catalyzed by organic acids and bases such that these oils typically evolve over a period of a few days from light colored liquids to dark mixtures with tar and resinous substances entrained in the mix. Also, attempts to re-gasify pyrolysis oil typically result in additional chemical reactions, which produce additional biochar and a shift to lower molecular weight components in the resulting gas stream. Although fairly high yields of pyrolysis oil can be achieved in laboratory scale experiments, larger industrial scale demonstration projects typically produce much lower yield. This is presumably due to the wider range of temperatures, hold times and localized pressures within the much larger heated three dimensional volumes of such scale-up architectures.

SUMMARY OF THE INVENTION

Various embodiments of this invention provide systems and methods for biomass fractioning that addresses the major issues of biomass pyrolysis as detailed above while still utilizing the fundamental mechanism of heating biomass materials in a reduced oxygen, neutral or reducing environment. Certain embodiments of invention may be referred to as biomass fractionators.

Some embodiments of the invention involve dispensing ground biomass into thin sheets for further processing. In doing so, an environment similar to laboratory scale tests is produced; however, the environment is scalable in that it can be expanded in two dimensions to any practical working throughput while retaining a constant thickness for heat treatment of incoming materials.

Other embodiments of the invention involve subjecting individual compartments of biomass sheets to carefully controlled ramps of temperature versus time, pressure and local working gas composition, in order to selectively extract various groups of compounds from the processed biomass. In this manner, the biomass pyrolysis products are effectively fractionated into various working streams, much like a crude oil cracking tower separates incoming fossil crude into various working streams.

In yet other embodiments of the invention, modular mechanical constructs are used to facilitate multiple fractionating stations, all within a pressure vessel, which can operate below atmospheric pressure, in open air, and at elevated pressures up to and including temperatures and pressures required for supercritical water as a working medium. Such embodiments incorporate multiple stage input and output airlocks to facilitate inputting biomass in bulk and discharging biochar and various fractionation streams from a potentially very high temperature and pressure internal environment, on an efficient basis. Some embodiments further accommodate variable thermal isolation and gas flow isolation between the various modular pyrolysis processing stations described herein. This allows for improved fractionator yield by way of substantial changes in temperature, pressure and local gas composition at various processing stations.

Various embodiments of the invention are specifically designed to operate in a supercritical environment. Generally, supercritical fluid environments provide both a substantial improvement in heat transfer as compared to gaseous environments and a substantial increase in chemical reaction rates, as compared to liquid environments due to their much, much higher rate of diffusion. Specifically, embodiments are designed to operate with supercritical carbon dioxide, supercritical water, methane, methanol and other small hydrocarbons, their oxygenates, and mixtures of the above such as 60% $CO_2$, 30% water, 10% methane and other organics. The following table lists the supercritical parameters for some key constituents.

| Solvent | Critical temperature in degrees Kelvin | Critical Pressure in Atmospheres |
| --- | --- | --- |
| Carbon Dioxide | 304° K. | 72.8 |
| Water | 647° K. | 218 |
| Methane | 190° K. | 45 |
| Methanol | 512° K. | 79.8 |

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF EMBODIMENTS OF THE INVENTION

The following diagrams and description present examples of the invention, but in no way, limit the application of the above concepts. The following designs are simply illustrative of their application.

Figure 1:
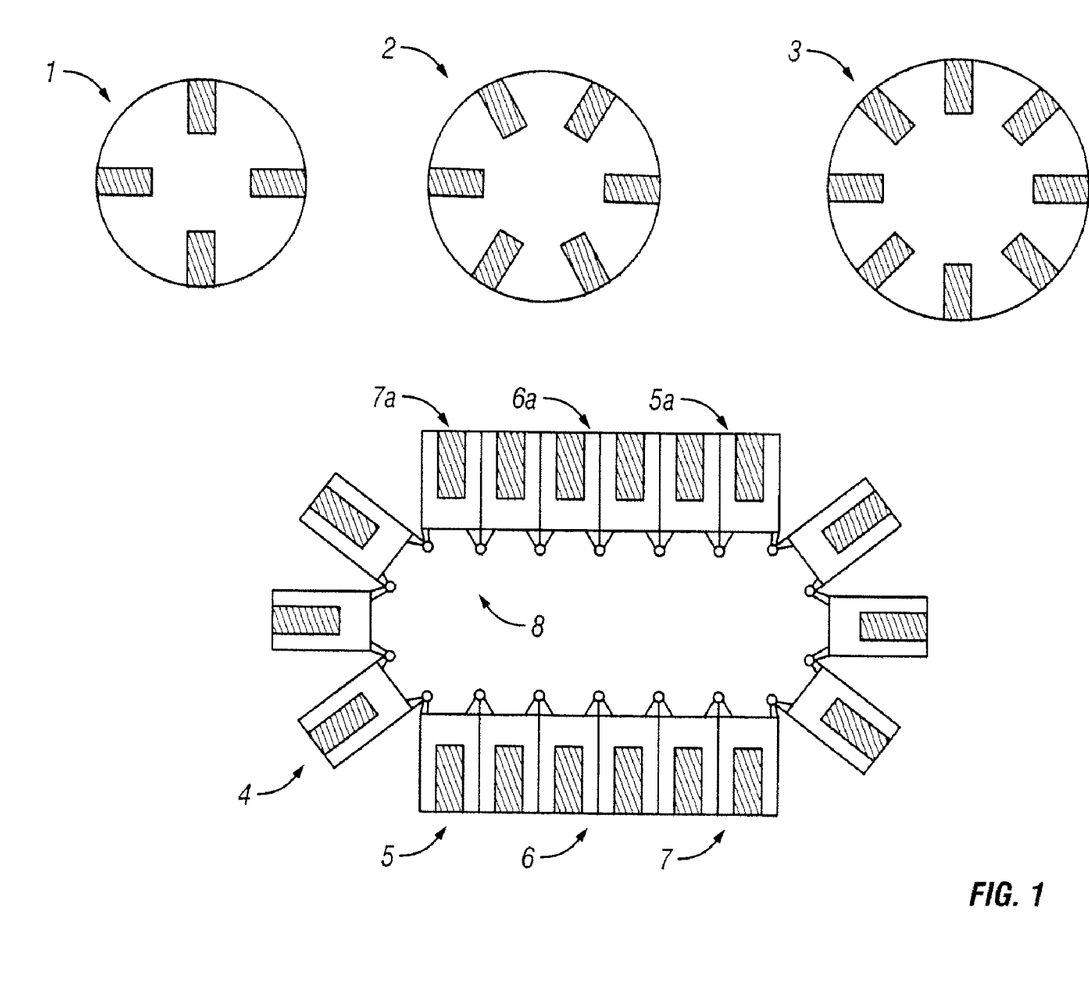
FIG. 1 is a diagram of example biomass reaction compartments in accordance with some embodiments of the invention.

FIG. 1 is a diagram of example biomass reaction compartments in accordance with some embodiments of the invention. As illustrated in FIG. 1, biomass reaction compartments can be machined or cast into solid discs (1, 2, 3). These discs may rotate via any of a number of common drive mechanisms such as gear drives, chain drives, ratcheting sprockets, etc. The disc can rotate continuously. However, to simplify operation of individual processing stations, it may be desirable to step the disc, typically with the same number of indexes per rotation as there are biomass chambers. Although embodiments of the invention can have one or more chambers in a disc, preferably there are 4 to N chambers in a disc.

Still referring to FIG. 1, the biomass chamber is much wider and longer than it is thick. A preferred thickness for the chamber for uncompressed biomass (which is ground or chopped to ⅛" or smaller) is approximately ¾" in thickness. As the biomass is heated and further pulverized (as discussed below), the emerging biochar quickly condenses to a layer about ⅒" thick. A person of skill in the art will appreciate that these biomass chambers can be sized in width and length along with the diameter of their corresponding drive disc to any such size as appropriate for the desired throughput for the biomass fractionator. For example, a 34" diameter disc of 1" thick 316 stainless steel can have six chambers (4" wide×10" long×¾" deep) indexed to the perimeter of the disc. Such a disc can efficiently process about 130 grams of dry biomass per chamber. When operating at 20 rotations per minute, 20 hours per day for 250 days per year, the disc can produce over 500,000 gallons per year of useful bio-intermediary chemicals and biofuels. Alternatively, such drive discs can be made of inexpensive base materials such as cast iron that is coated, plated, or clad with corrosion resistant metals and/or ceramics. In addition, the plates can feature various thermal isolation structures between the chambers such as honeycombs, voids, simple slots, insulation filled cavities, etc., to facilitate large temperature extremes between adjacent processing stations. Such structures may be positioned on the disc planar surface opposite the chamber cavities.

Optionally, the top surface of the disc could be smoothed or coated with an appropriate solid-state lubricant to accommodate various types of gas seals between adjacent processing stations such as gas turbine style labyrinth seals, roller seals, sliding seals, or expandable/retractable seals.

For very large high throughput embodiments, the main disc is subdivided into a large series of interconnected plates that move around a designated race track in an oval configuration 4 with interconnection hinges 8. Although processing stations can be located anywhere along the track, it may be preferable to arrange the processing stations in a linear manner along the straight portions of the oval track (at 5, 5A, 6, 6A, 7, 7A), rather than at positions along the circular part of the oval track. In some embodiments, only one side of the track contains processing stations. Other embodiments feature a geometry adapted for very high throughput, wherein both sides of the track contain processing stations, such that the matching station on each side corresponds to its number and its alphabetic suffix.

Figure 2:
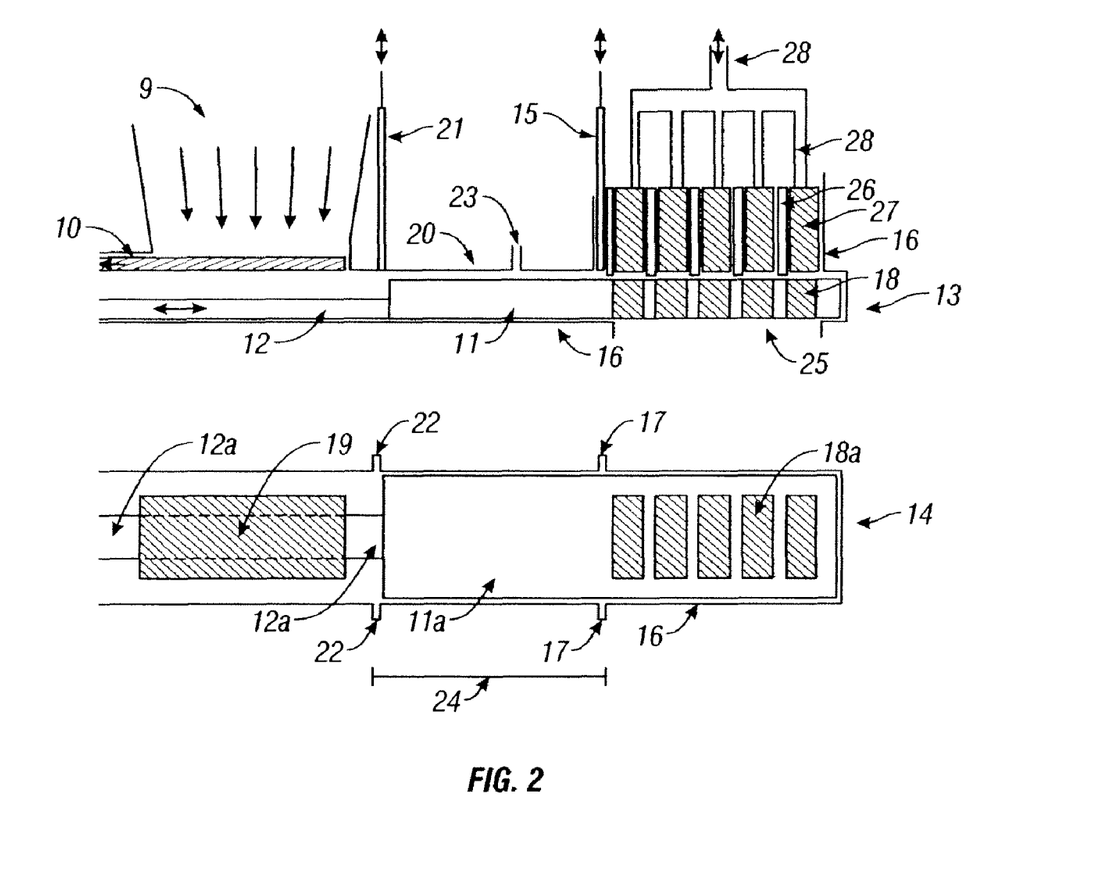
FIG. 2 is a diagram of an example load and dump station for ground biomass in accordance with one embodiment of the invention.

FIG. 2 illustrates an example load and dump station for ground biomass comprising a hopper, a dispenser, an airlock, and a transfer mechanism in accordance with one embodiment of the invention. Generally, this load and dump station comprises the first station at the lowest operating temperature of an embodiment. Ground biomass (e.g., ⅛" or smaller) is placed in hopper 9 resting on a sliding gate valve 10. A transfer plate (11, 11A) is retracted to the fill position by control bar (12, 12A) via conventional control schemes such as an air cylinder. The slider bar and hopper are depicted in side view 13 and top view 14. While the transfer plate is in the left or fill position, airlock door 15 is pushed down to the closed position, contacting pressure bulkhead 16 through guide slots 17. The airlock 15 is actuated by a common control scheme such as an air cylinder. When the transfer plate is in the fill position, transfer fill slots 18 are located in the hopper fill zone 19. The hopper sliding gate valve 10 is quickly retracted, filling the transfer fill slots 18 with ground biomass. The sliding gate valve 10 is then quickly closed. Then, as the transfer plate (11, 11A) is moved to the right, the biomass remains in the transfer slots (18, 18A) due to the action of the pressure bulkhead 16 on the bottom and a slightly sloping compression plate 20 on top. As the transfer plate (11, 11A) approaches the airlock door 15, it is retracted, allowing the transfer plate (11, 11A) to proceed to the dump position as depicted in FIG. 2. Immediately upon settling in the dump position, air door 21 closes behind the transfer plate (11, 11A) and around the actuator bar (12, 12A) contacting the pressure bulkhead 16 through guide slots 22. Optionally, the chamber volume can be pressure equalized through port 23.

Referring still to FIG. 2, the transfer plate (11, 11A) can operate with both air doors (15, 21) open simultaneously during transfer and retract operations in a compact design suitable for relatively low-pressure operation up to a few atmospheres. At ultra-high pressure operation (e.g., with supercritical water at 218 atmospheres and above), the airlock spacing 24 between air doors (15, 21) should be wide enough to allow one door to close before the next door opens. In this manner, airlock spacing 24 is wide enough to accommodate the full length of the transfer plate (11, 11A). Under such a scenario, pressurization equalization via port 23 is important for efficient operation.

With the transfer plate (11, 11A) in the dump position as depicted in FIG. 2, biomass is entrained in the transfer slots (18, 18A) and is free to fall through transfer opening 25 on to a biomass compartment of disc (1, 2, 3) or hinged plate set 4. The entrained biomass is constrained from above by fixed guide plates 26 and movable plungers 27. The movable plungers 27 are then pushed down through the transfer slots (18, 18A) to ensure essentially complete biomass transfer from the biomass transfer plate (11, 11A) to the disc (1, 2, 3) via drive mechanism 28, which can be operated by any conventional means such as an air cylinder. The transferred biomass then rotates out of position under the pressure bulkhead (16, 20) at the same time the transfer plate (11, 11A) is retracted through the reversal of the air door sequence to the fill position where the process is repeated.

The number of transfer slots (18, 18A) in FIG. 2 with their corresponding structures (26, 27) is set by the propensity of the ground biomass to roll up, compress and, potentially jam on its movement from the load position to the dump position in transfer plate (11, 11A). For dry (under 10% water content) ⅛" ground biomass, an approximately 2 to 1 aspect ratio of slot width to chamber height may be employed, e.g., 1½" width for a transfer plate thickness of ¾". Configuration adjustments for slots (18, 18A) and corresponding structures (26, 27, 28) may be appropriate with different biomass feedstock, varying water content, and varying working media conditions such as supercritical water based operation.

Figure 3:
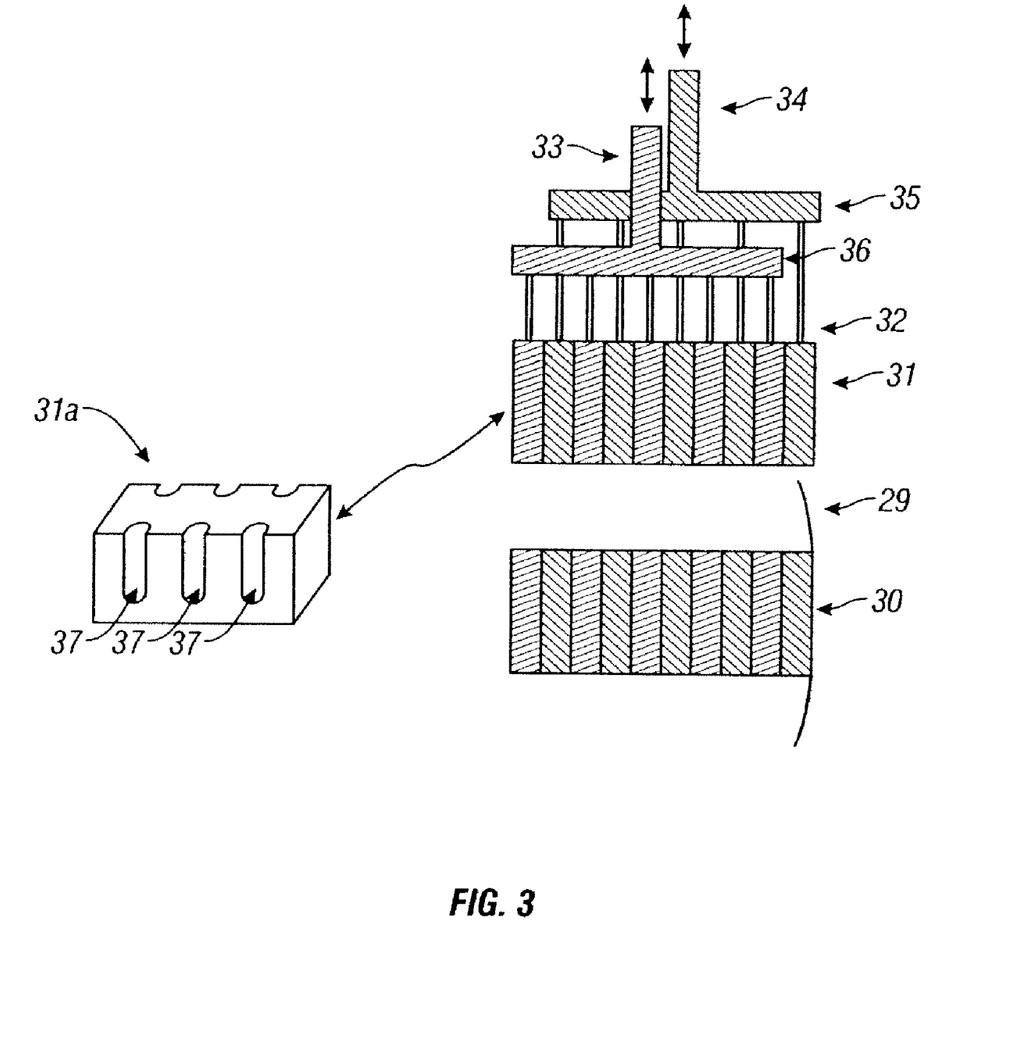
FIG. 3 is a diagram of an example heating and pulverizing processing station in accordance with one embodiment of the invention.

FIG. 3 depicts an example of one or more heated pulverizing processing stations in accordance with one embodiment of the invention. Specifically, FIG. 3 shows the top view 29 of a rotating disc (1, 2, 3) with a corresponding biomass processing chamber 30 operated on by two or more sets of compressing structures 31 shown in side view 32. The compressing structures 31 are operated by matching sets of actuators (33, 34) through force distribution plates (35, 36). Each compressing structure 31 can be equipped with gas vent slots 37, which become exposed and functional as each compressing block 31A is pushed down into the biomass.

During operation, the disc (1, 2, 3) moves the incoming biomass from a load and dump station, such as depicted in FIG. 2, to a heating and pulverizing station, such as depicted in FIG. 3. The biomass is held in place during this rotational movement by the floor of the disc (1, 2, 3), the sidewall and the top of the pressure vessel until it arrives at the first heating and pulverizing station (e.g. FIG. 2), where the compressing blocks 31A are at a rest position flush with the top of the chamber. This position can be heated by electrical heating elements, direct flame combustion, or by directed jets of heated working gas or supercritical fluid. The objective of the first working station is to drive off entrapped water and to perform first stage dehydration of the biomass while compacting it for more effective heat transfer at later stages. While biomass is being heated at this station, it is compressed and pulverized by the up/down action of two or more sets of compressing blocks 31A. Water vapor is extracted primarily through the slots 37 and some parasitic leakage around the structure (31, 35, and 36). The downward motion of the force bars (35, 36) can be limited to compact the dehydrating biomass to a designated thickness such as, for example, 0.3" thick. At an example processing speed of 20 rotations per minute for a six-station disc 2, processing time per station is 0.5 seconds less indexing time of about 0.1 seconds, or, 0.4 seconds. This will practically allow up to 10 pulverizing cycles at this relatively high disc rotating speed. The high transfer rate also implies a high temperature-heating source to bring the biomass in biomass processing chamber 30 up to de-watering and first stage dehydration in the 150° C. region.

In accordance with some embodiments, at least one additional pulverizing station as depicted in FIG. 3 is utilized as a third station in the fractioning sequence, after the biomass input station and the dewatering station. In this second heated pulverizing station in the sequence, the biomass is further heated and compacted to outgas commercially viable biointermediary compounds. In further embodiments, multiple such stations can be added in series around increasingly large discs (1, 2, 3), or, even longer processing chains via oval track 4. Various combinations of temperature profile, pressure and working gas phase or supercritical media can be utilized to extract various compounds such as (i) long chain dehydrated sugars; (ii) lignin derived aromatics; (iii) lipid based oils; (iv) carbohydrate based furans; (v) shorter hydrocarbons; (vi) oxygenates such as butane, butanol, acetone, acetylaldehyde, aldehyde, methane, methanol, etc.; and (vii) ultimate syngas components (hydrogen, carbon monoxide, and carbon dioxide). At each successive processing stage, the station is heated to a higher temperature via the various heating schemes detailed above, and the material is compacted to a thinner layer with an increasing level of elemental carbon in the remaining biomass.

In order to preserve some level of carbon and to effect a specific carbon yield, some embodiments later perform one or more stages of thermal processing that can eliminate the compaction mechanism (31, 33, 34, 35, 36) and simply substitute a gas or supercritical fluid pick off. Such a station can maximize the production of high purity carbon.

Figure 4:
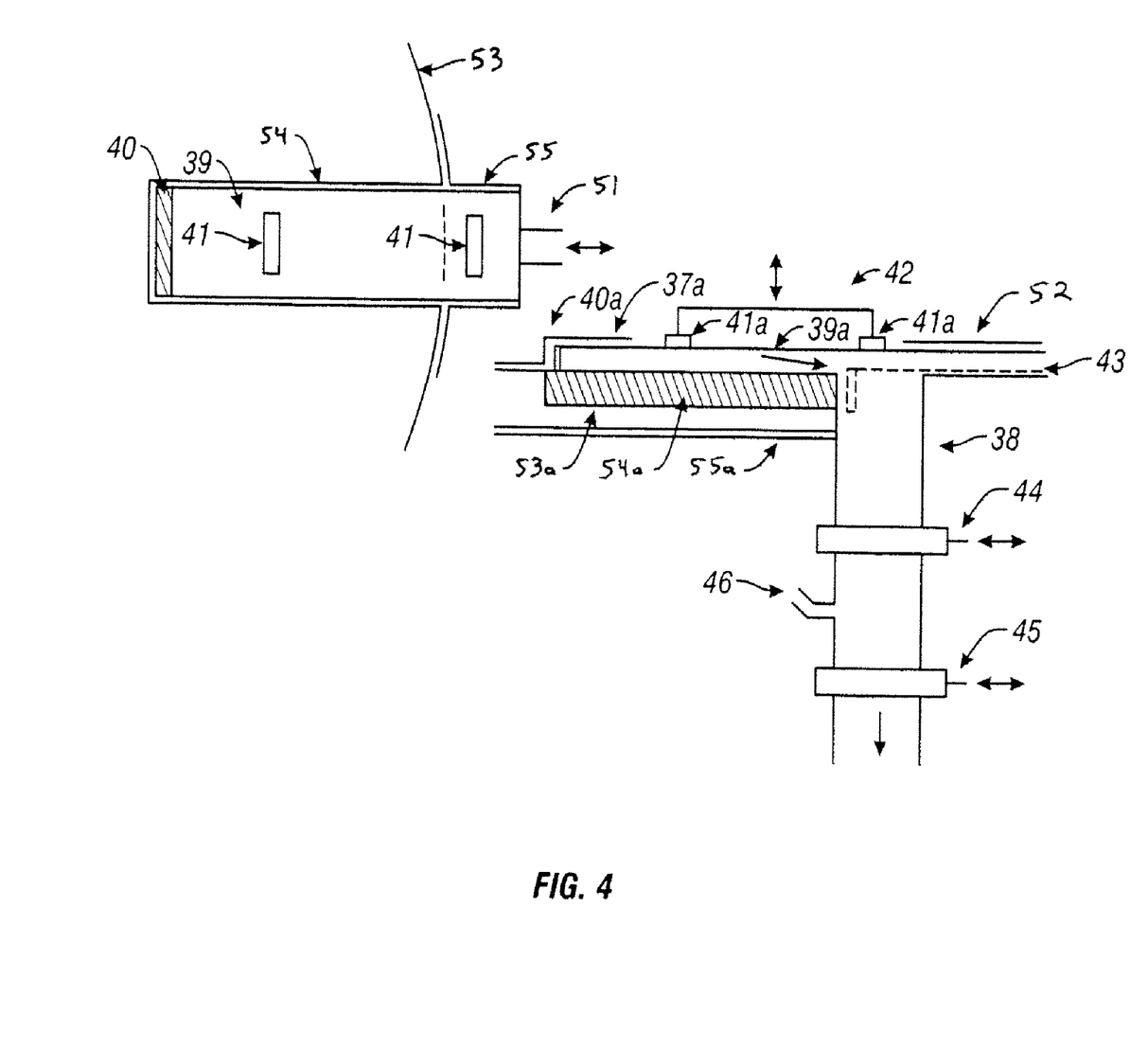
FIG. 4 is a diagram of an example biochar processing station in accordance with one embodiment of the invention.

FIG. 4 depicts an example of a last processing station in accordance with one embodiment of the invention. The processing station is positioned before the disc returns to the biomass fill hopper. This unheated station empties the biomass chamber of residual carbon or biochar into an air-locked hopper for collection. Since this biochar has a propensity to fuse to the chamber floor and walls, a scraping knife action is used to transfer this remaining carbon to an output chute. A vertical overview of this mechanism is depicted in view 51, and is depicted with horizontal cross section in view 52. The main drive disc (1, 2, 3) is shown as elements (53, 53A) with the biomass chamber (54, 54A) surrounded by pressure vessel (55, 55A) and dump chute 38. Scraping knife (39, 39A) is depicted in the rest position with scraper blade (40, 40A). It is pushed down by rollers or sliders (41, 41A) and press bar 42 via any conventional means such as an air cylinder, and is retracted by any conventional means such as another air cylinder to dotted line position 43 in order to transfer the remaining carbon or biochar into the dump chute 38 to gate valve 44. In embodiments with relatively low-pressure configurations, a simple gate valve can be used to discharge the biochar out of the system. In alternative embodiments with higher-pressure applications, a dual gate valve 45 including pressure equalization port 46 should be utilized for efficient operation.

With continued reference to FIG. 4, once the carbon has been scraped out of the chamber, the disc proceeds back to the fill station as the knife rises to its upper rest position and is extended to its start position. Biochar is periodically dumped through one or more gate valves (44, 45) via a program to minimize pressure loss from the system.

Figure 5:
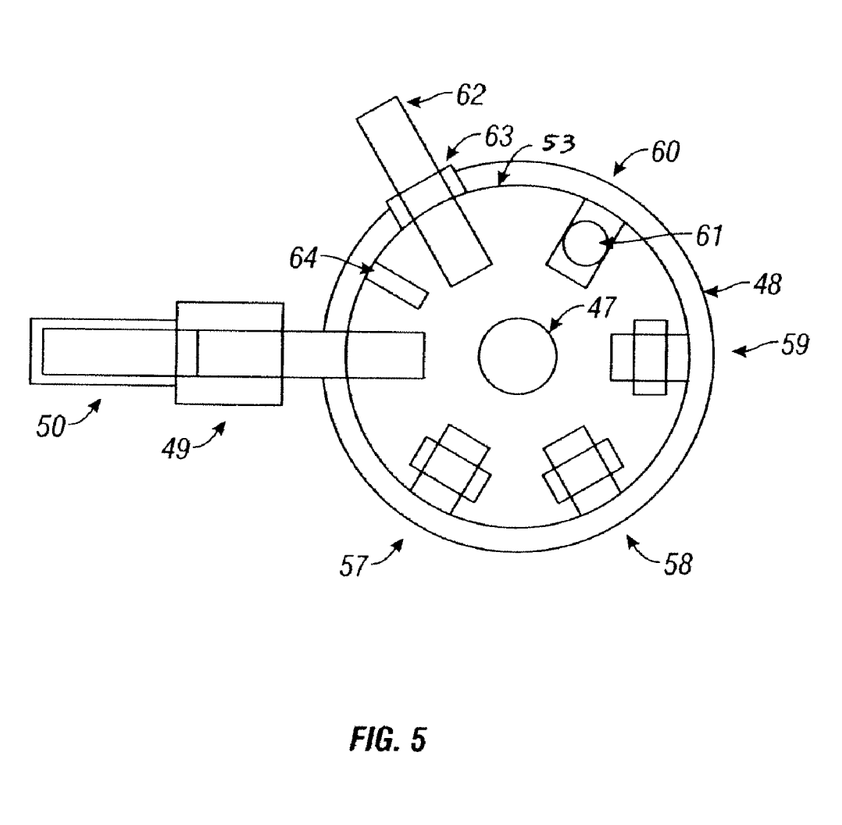
FIG. 5 is a diagram of an example biomass fractionator system of six stations in accordance with one embodiment of the invention.

FIG. 5 depicts an example of a complete system of six stations in accordance with one embodiment of the invention. The illustrated system uses a 34" diameter disc (2, 53) at up to 20 rpm utilizing a supercritical working medium comprised mostly of carbon dioxide to produce up to 500,000 gallons per year of useful bio-intermediaries and biofuels. The main disc (2, 53) is driven on its center axis by an indexing stepping motor 47. It is housed in a pressure vessel 48. Chopped biomass is dispensed into an input hopper 49 via the transfer plate mechanism 50 of FIG. 2. The plate then indexes to position 57 where a heated pulverizing processing station as depicted in FIG. 3 dehydrates the biomass. At the same time, the hopper and biomass transfer station (49, 50) loads the next sequential biomass reaction compartment. The disc then indexes to station 58 where the initial load of biomass is further heated and pulverized to release low boiling point bio-compounds and pyrolysis fragments. At the same time, the second load of biomass is moved from station #1 (57) to station #2 (58) where it is dehydrated and a third load of biomass is transferred from the hopper to a corresponding biomass reaction chamber. This process continues around the circle until all stations are full, and then runs continuously until the last stations are emptied during the turn off process. As such, the description of this continuous stepping process will not be repeated in conjunction with the stations to follow, but is implied in their operation.

Continuing with reference to FIG. 5, the first loaded biomass chamber then proceeds to station 59 where an even hotter pulverizing station as depicted in FIG. 2 drives off heavier biomass fragments such as sugar derived furans and lignin derived aromatics.

Then, as the disc (2,53) increments, the first biomass load moves to station 60, comprising a heater system and a gas venting system 61, to complete the pyrolysis process by driving the residual hydrocarbons off the biochar, typically in the form of syngas.

The disc then increments to station 62, comprising the biochar dumping station as depicted in FIG. 4, which scrapes the biochar into an exit hopper 63. The emptied biomass chamber then indexes back to the initial fill station and is sequenced around the disc as described herein throughout the normal operation of the biomass fractionator. An optional cooling station 64 may be incorporated, as necessary, to reduce the wall temperature of the biomass reaction chamber prior to the next filling in order to ensure a consistent increasing temperature profile for incoming biomass.

At system shut down, the hopper is shut off or allowed to run out of material, and the remaining biomass processing stations are emptied through the biochar chute. In the case of a system malfunction, the biochar clearing knife station can readily clean out any partially processed or unprocessed stations. Such improperly processed materials will simply be dumped in an alternate collector at the bottom of the biochar collection chute 38.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for biomass fractioning, comprising:
    a biomass load and dump station for receiving ground biomass into the system;
    a plurality of heated pulverizing processing stations for compressing ground biomass;
    a biochar dumping station for collecting residual carbon and biochar; and
    a plurality of biomass reaction compartments, each containing a heated pulverizing processing station, wherein each biomass reaction compartment experiences an incrementally higher temperature than another compartment.

2. The system of claim 1, wherein the biomass load and dump station comprises:
    a hopper for storing and funneling ground biomass;
    a dispenser for dispensing ground biomass from the hopper
    an airlock for receiving ground biomass from the dispenser; and
    a transfer mechanism to move ground biomass within the biomass load dump station.

3. The system of claim 1, wherein each heated pulverizing processing station heats the ground biomass in order to dehydrate the ground biomass.

4. The system of claim 1, wherein each heated pulverizing processing station heats the ground biomass by way of either electrical heating elements, direct flame combustion, directed jets of heated working gas, or directed jets of supercritical fluid.

5. The system of claim 1, wherein each heated pulverizing processing station heats the ground biomass in order to collect bio-intermediary compounds.

6. The system of claim 1, wherein each heated pulverizing processing station compresses the ground biomass while it is pulverized.

7. The system of claim 1, wherein the plurality of biomass reaction compartments is implemented as one or more discs.

8. The system of claim 1, wherein the plurality of biomass reaction compartments is implemented as a series of interconnected plates.

9. The system of claim 8, wherein the series of interconnected plates is configured in an oval configuration.

* * * * *